United States Patent [19]
Brandle, Jr. et al.

[11] Patent Number: 5,801,875
[45] Date of Patent: *Sep. 1, 1998

[54] ARTICLE COMPRISING A MAGNETO-OPTIC MATERIAL HAVING LOW MAGNETIC MOMENT

[75] Inventors: Charles David Brandle, Jr.; Vincent Jerome Fratello, both of Basking Ridge; Steven Joy Licht, Bridgewater, all of N.J.

[73] Assignee: Lucent Technologies Inc., Murray Hill, N.J.

[*] Notice: The term of this patent shall not extend beyond the expiration date of Pat. No. 5,608,570.

[21] Appl. No.: 653,085

[22] Filed: Jun. 12, 1996

Related U.S. Application Data

[63] Continuation-in-part of Ser. No. 498,099, Jul. 5, 1995, Pat. No. 5,608,570.

[51] Int. Cl.$^6$ .................................................. G02F 1/00
[52] U.S. Cl. ........................................... 359/321; 359/281
[58] Field of Search .................................... 359/281, 280, 359/321, 324

[56] References Cited

U.S. PATENT DOCUMENTS

| | | | |
|---|---|---|---|
| 4,896,103 | 1/1990 | Shimanuki et al. | 359/281 |
| 5,198,297 | 3/1993 | Tanno et al. | 428/336 |
| 5,608,570 | 3/1997 | Brandle, Jr. et al. | 359/321 |

FOREIGN PATENT DOCUMENTS

| | | |
|---|---|---|
| 0 647 869 A1 | 4/1995 | European Pat. Off. |
| Heisei 6-222311 | 8/1994 | Japan |

OTHER PUBLICATIONS

Japanese Patent Application (Heisei 6–222311), opening date August 12, 1994, to Y. Honda, translation: yes.

"Optical Isolators for Optical Communication Systems", by S. Makio et al., *Electronics and Communications in Japan*, Part 2, vol. 74, No. 2, 1991.

"Magnetless Faraday Rotator of ($BiYO_3Fe_5O_{12}$) Waveguide with Stripe Magnetic Domains", by K. Matsuda et al., *Applied Physics Letters*, vol. 59(5), p. 507 (1991).

"Magnetic Garnets", by G. Winkler, Vieweg, Germany (1981).

"Recent Advances of Bismuth Garnet Materials Research for Bubble and Magneto–Optical Applications", by P. Hansen et al. *IEEE Transactions on Magnetics*, vol. MAG–20, No. 5, sep. 1984.

"The Physical Principles of Magnetism", by A. H. Morrish, J. Wiley and Sons, New York, 1965, pp. 332–340.

"Fiber Optics", Mitsubishi Gas Chemical Company, Inc., 1995, p. 5.

"Large Stable Magnetic Domains", by G. R. Pulliam et al., *J. Appl. Phys.*, vol. 53 (3), Mar. 1982, pp. 2754–2758.

*Primary Examiner*—Georgia Y. Epps
*Assistant Examiner*—Dawn-Marie Bey
*Attorney, Agent, or Firm*—Eugen E. Pacher

[57] ABSTRACT

Garnet material according to a particular embodiment of the invention exhibits a substantially rectangular magnetization loop, with $|H_S|>|4\pi M_S|$ Oe and $|4\pi M_S|<100$ G over a predetermined operating range (e.g., $-40°$ to $+80°$ C.), where $H_S$ is the switching magnetic field of the loop, and $4\pi M_S$ is the saturation magnetization. The material exhibits improved latching behavior. In a further embodiment of the invention the composition of the garnet material is selected such that the material exhibits hard latching behavior ($|H_s|>500$ Oe) at least at room temperature. Garnet materials according to the invention can advantageously be used in magneto-optic isolators and other magneto-optic devices. For instance, the material enables manufacture of isolators that do not contain a bias magnet. Garnet materials according to the invention generally contain at most relatively small amounts of Gd, Tb and Dy (less than 1.0, 2.1 and 2.5 atoms per formula unit, respectively; with Gd+(Tb/2.1)+(Dy/2.5)<1.0), and generally contain Eu and/or Ho. In a departure from prior practice, compositions according to the invention can have a compensation temperature in the operating temperature range, e.g., at room temperature. An exemplary garnet according to the invention has nominal composition $Bi_{0.75}Eu_{1.5}Ho_{0.75}Fe_{4.1}Ga_{0.9}O_{12}$.

15 Claims, 2 Drawing Sheets

(RPIOR ART)

ARTICLE COMPRISING A MAGNETO-OPTIC MATERIAL HAVING LOW MAGNETIC MOMENT

CROSS REFERENCE TO RELATED APPLICATION

This application is a continuation-in-part application of U.S. patent application Ser. No. 08/498099 filed Jul. 5, 1995, now U.S. Pat. No. 5,608,570.

FIELD OF THE INVENTION

This invention pertains to magneto-optic materials with low magnetic moment, and to apparatus and articles (e.g., an optical fiber communication system that contains an optical isolator) that utilize the material.

BACKGROUND OF THE INVENTION

It is well known that the Faraday effect in magneto-optic materials can be used to provide a non-reciprocal device that can serve as an isolator, i.e., a device that permits passage of light in only one direction. Among known magneto-optic materials are Bi-substituted rare earth iron garnets such as $(Bi_xTb_{1-x})_3(Fe_yGa_{1-y})_5O_{12}$. For a description of magneto-optic isolators see, for instance, S. Makio et al., *Electronics and Communications in Japan*, Part 2, Vol. 74(2), p. 323 (1991), incorporated herein by reference.

Magneto-optic materials used in prior art isolators typically have relatively high saturation magnetization, which typically requires the use of a relatively large, high field permanent magnet (e.g., SmCo) that typically is not only expensive but also may affect, and/or be affected by, nearby components.

It is well known that ferrimagnetic garnet materials generally have magnetic domains, and that application of a magnetic field to such a material results in change of the domain structure. In particular, in a field greater than or equal to the saturation field, such a material generally will contain essentially a single magnetic domain, with magnetization oriented along the direction of the applied field. Upon removal of the applied field the material generally reverts to a randomly oriented multi-domain state. In magnetically saturated material the Faraday rotation experienced by light transmitted through the material is also saturated. Optical isolators generally are designed to operate with magnetically saturated magneto-optic material, although unsaturated material also has utility.

It would clearly be advantageous to have available magneto-optic materials that have relatively low saturation magnetization and are otherwise suitable for use in optical isolators. It would be particularly desirable to have available a magneto-optic material that can, after having been magnetically saturated, substantially remain in the saturated (single domain) state. Those skilled in the art will recognize that such a material for instance would make possible isolators without (or with relatively weak) permanent magnets. This application discloses materials that have the above described property, which herein will be referred to as "latching". K. Matsuda et al., *Applied Physics Letters*, Vol. 59(5), p. 507 (1991), propose and demonstrate a completely different design of a magnetless Faraday rotator that utilizes a garnet waveguide with stripe magnetic domains.

Bi-doped rare earth iron garnets are known (see, for instance, Japanese patent application Heisei 3-306697 of Oct. 24, 1991 by Y. Toba), and are used in optical isolators. These garnets generally have values of saturation magnetization above about 150 G. For instance, some commercially available $(Bi,Tb)_3(Fe,Ga)_5O_{12}$ materials have values in the range 150–390 G, and some commercially available (BiGd)$_3$(Fe, Ga, Al)$_5O_{12}$ materials have values of about 200 G. Garnets that have much lower values of saturation magnetization are also known. For instance, G. Winkler, "Magnetic Garnets", Vieweg, Germany (1981), p. 611, discloses material of composition $Er_2Eu_1Fe_{3.7}Ga_{1.3}O_{12}$ with a saturation magnetization of 10 G. The material was considered to have utility for a magneto-optic display. P. Hansen et al., *IEEE Trans. Magn.*, MAG-20, p. 1099 (1984) disclose a low moment material substantially of composition $Bi_1Gd_2Fe_{4.4}Ga_{0.2}Al_{0.4}O_{12}$ for thin film visible light displays using the compensation point of the material and thermomagnetic writing. See also Japanese patent application No. Heisei 5-12046, publication No. Heisei 6-222311, Aug. 12, 1994; European patent application No. 94113620.2, publication No. 0647869A1, Apr. 12, 1995; and G. R. Pulliam et al., *J. Applied Physics*, Vol. 53 (3), p. 2754, March 1982, all of which disclose magneto-optic materials that exhibit some latching behavior at room temperature.

Although the prior art thus knows latching magneto-optic materials, these materials have shortcomings that to date have prevented their use. For instance, the prior art materials do not exhibit "hard" latching at room temperature, and/or have compositions having relatively high temperature dependence of magnetic properties. It clearly would be highly desirable to have available magneto-optic materials that are not subject to these shortcomings. This application discloses such materials.

It will be understood that, in order to be useful for isolator application, a magneto-optic material not only needs to have relatively high specific Faraday rotation and relatively low saturation magnetization but typically also has to have low attenuation (e.g., <0.2 dB for a 45° film) for, typically, radiation of the signal wavelength (e.g., 1.54 µm). Furthermore, it will generally be necessary that the material can be grown as a single crystal film that is thick enough to provide 45° rotation per pass of the relevant radiation through the saturated film. However, other possible applications of Matching magneto-optic material may not demand all of these features.

GLOSSARY AND DEFINITIONS

The "magnetization loop" of a ferro- or ferrimagnetic material is the curve of magnetization vs. applied magnetic field, as described, for instance, in "The Physical Principles of Magnetism", A. H. Morrish, J. Wiley & Sons, New York 1965, pp. 332–340.

A magnetization loop is "substantially rectangular" if the width of the magnetization reversal is at most 10 Oe, preferably less than 5 Oe.

The "switching field" ($H_S$) of the magnetization loop herein is the applied field at which the magnetization goes through zero. $H_S$ corresponds to the "coercive field" ($H_c$) of the conventional magnetization loop.

By "hard" latching we mean herein that the material has $H_S \geq 500$ Oe, at least at room temperature, sufficient to avoid switching under commonly encountered conditions.

The "compensation point" of a garnet material is the temperature (below the Curie temperature) at which the saturation magnetization of the material passes through zero, with the optical rotation in a given applied field at temperatures below the compensation point being of opposite sense with respect to the direction of the saturation from the rotation above the compensation point.

SUMMARY OF THE INVENTION

The invention is embodied in an article or apparatus (collectively "article"; e.g., an optical isolator, or an optical fiber communication system that comprises an isolator according to the invention) that comprises a body of magneto-optic garnet material (e.g., a platelet-shaped single crystal body of approximate composition as defined below). The body has a major surface, a thickness, and a magnetization (including a saturation magnetization $4\pi M_S$) in a direction normal to the major surface. The article further typically comprises means (e.g., a radiation source and an optical fiber) for causing electromagnetic radiation of wavelength $\lambda$ (e.g., a conventional communication wavelength such as 1.3 or 1.54 µm, or a pump wavelength such as 1.47 µm) to be incident on the major surface, with at least some (typically nearly all) of the incident radiation transmitted through the body and available to be received by appropriate utilization means (e.g., optical fiber and/or a detector).

Significantly, in a particular embodiment the composition and preparation of the body re selected such that the body has a substantially rectangular magnetization loop, with $|4\pi M_S|<100$ G, with the absolute value of the switching field $|H_S|>|4\pi M_S|$ Oe, and $|H_S| \geq 500$ Oe at least at room temperature, in a magnetic field H applied parallel (or anti-parallel; collectively "parallel") to the direction normal to the major surface. The above second inequality is to be understood to require that the absolute value (in Oe) of $H_S$ is greater than the absolute value (in G) of $4\pi M_S$. The body typically is at least 30 µm thick, and frequently will be more than 50 µm thick. In consequence of the above limitations the body exhibits hard latching behavior at least at room temperature.

In a further embodiment the composition and preparation of the body are selected such that the body has a substantially rectangular magnetization loop, with $|4\pi M_S|<100$ G and $|H_S|>4\pi M_S|$, typically $|H_S|>100$ Oe or even 200 Oe, in a magnetic field applied parallel to the normal to the major surface, with the above conditions met over a predetermined temperature range that includes room temperature, and preferably also includes an elevated temperature such as 60° or 80° C., e.g., a conventional operating range (–40° to +80° C.) of optical isolators. The material attains these characteristics at least in part through choice of a composition that minimizes certain commonly used constituents, e.g., Gd, Tb and Dy.

Garnet materials according to the invention may or may not have a compensation point in the predetermined temperature range. In some preferred embodiments the garnet material has an attenuation of at most 7 dB/cm at 1.3 µm, and at most 4 dB/cm at 1.54 µm, and has a specific rotation of at least 1000°/cm at 1.3 µm and 700°/cm at 1.54 µm, all at room temperature (20° C.). At least for conventional isolator applications the thickness of the body will typically be selected such that the body provides 45° ±15° rotation of the plane of the polarization of the radiation of interest (typically in the approximate range 0.75–1.6 µm).

The novel latching magneto-optic materials make possible devices not heretofore possible. Among these are optical isolators without bias magnets.

DETAILED DESCRIPTION

Figure 1:
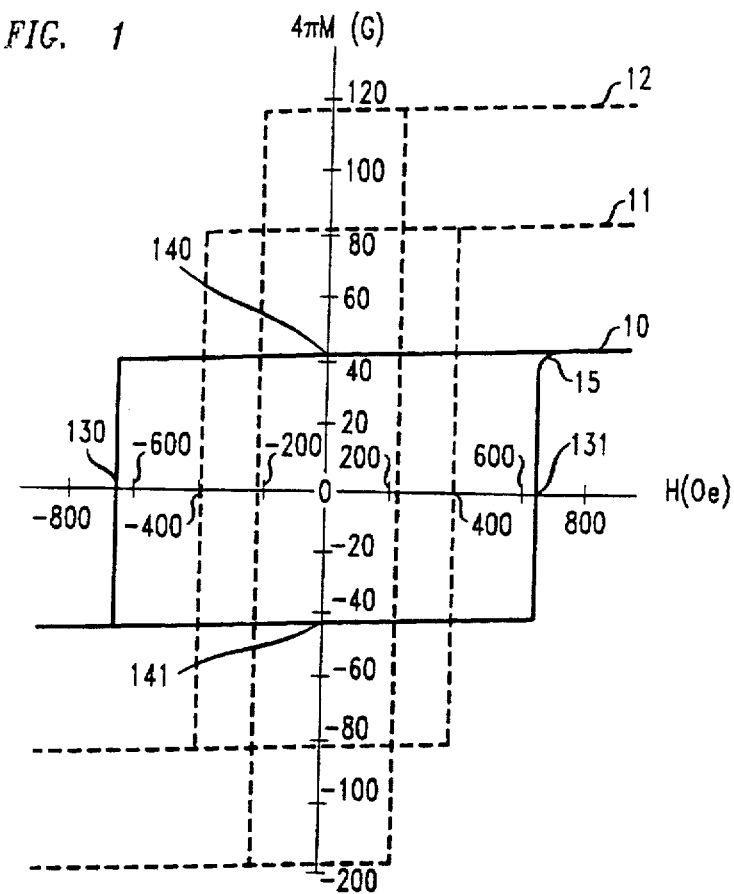
FIGS. 1–3 show curves of magnetization vs. applied magnetic field, with FIG. 1 pertaining to low magnetic moment materials according to the invention, FIG. 2 to intermediate moment prior art materials, and FIG. 3 to high moment prior art materials.

We have discovered that garnet materials that meet specified criteria can exhibit latching behavior over a substantial temperature range (e.g., a conventional operating range of optical isolators, namely, –40° to 80° C.), and/or can be hard latching at least at room temperature, and thus can be used to provide novel devices, e.g., optical isolators without bias magnets, or with a much weaker magnet than previously required.

The structure and characteristics of garnet materials are well known. Briefly, at any temperature the net saturation magnetization $4\pi M_s$ is given by $4\pi|M_d(T)-M_a(T)-M_c(T)|$, where $M_d(T)$, $M_a(T)$ and $M_c(T)$ are the temperature-dependent magnetization contributions of the tetrahedral, octahedral and dodecahedral sites, respectively.

In order to attain latching behavior over a wide temperature range, it is necessary to select compositions that have relatively weak temperature dependence of $4\pi M_s$. For this reason it is advantageous to avoid high concentrations of Gd, Tb and Dy. In order to maintain a high Curie temperature it is typically desirable to avoid high concentrations of octahedral substituents, e.g., Sc and, to a lesser extent, tetrahedral substituents (e.g., Ga, Al) beyond what is required to achieve the value of $4\pi M_s$ required for latching.

Garnet material that is useful in the practice of the invention can be grown by conventional techniques. See, for instance, "Magnetic Garnets", pp. 467–491. Exemplarily, the materials have nominal composition $(Bi_xA_{3-x})(Fe_{5-y}C_y)O_{12}$, where x is in the range 0.3–2.0 (preferably 0.8–1.5, most preferred ~1.0), A is one or more of the rare earths (atomic number 57–71), Y and Ca, C is one or more of Al, Ga, Si, Ge, Mg, Mn and Zr, and y is in the range 0.2–2.0 (preferably 0.5–1.5), selected such that $4\pi M_S$ and $H_s$ have the required values over the predetermined temperature range or at room temperature, as the case may be. The films frequently contain some impurities, e.g., Pb or Pt. The impurity concentration desirably is less than about 0.1/formula unit.

Typically the nominal composition will be selected not only to attain low saturation magnetization but also to give substantial lattice match with a desired substrate (to facilitate growth of single crystal garnet films), and to give low attenuation at a wavelength of interest. For instance, in order to attain low saturation magnetization it will frequently be advantageous to select a relatively high concentration of C ions With preferred tetrahedral substitution. By way of example, Ga, Al, Si and Ge reduce $4\pi M_S$ by, respectively, about 1354, 1211, 1582 and 1582 G/formula unit.

Those skilled in the art know how to modify garnet compositions to attain a desired lattice constant. Thus, attainment of substantial lattice match does not require discussion.

By way of further example, in order to attain low absorption at 1.3 µm it is typically desirable to avoid Dy (and possibly Sm), and in order to attain low absorption at 1.54 µm it is typically desirable to avoid Sm and Er.

Those skilled in the art know that the concentrations of 2+ and 4+ ions desirably will be evenly balanced to maintain stoichiometry and avoid optical absorption. Exemplary compositions are listed in Table I.

All the samples of Table I contain a small concentration of a divalent dopant (e.g., $Pb^{2+}$ or $Mg^{2+}$) to compensate in known manner for an excess of Pt impurity which commonly occurs in the 4+ valence state in garnets, and thereby maintain stoichiometry. This concentration of divalent species was not determined in these films, but is typically less than 0.05 per formula unit.

Exemplarily, single crystal garnet films according to the invention are grown by liquid phase epitaxy on (111)-oriented single crystal $(Gd_{2.68}Ca_{0.32})$ $(Ga_{1.04}Mg_{0.32}Zr_{0.64})$ $Ga_3O_{12}$, $Nd_3Ga_5O_{12}$, or $Gd_{3.03}Ga_{4.97}O_{12}$. Other substrates are possible.

Table I shows nominal composition (omitting unintended impurities and low level dopants as discussed above), thickness, and some magnetic parameters for some garnet samples according to the invention (samples 1–3), as well as for some prior art samples (4–9) that do not meet the requirements.

The magnetization loop of a given sample was determined by a procedure that involved magnetically saturating the sample, followed by tracing the loop by starting at a large positive saturating field, decreasing the field to the remanent magnetization of the magnet, reversing the field and scanning the field to a large negative field, then reversing the process.

Relatively high fields (typically $\geq 1000$ Oe) were typically required to initially saturate the material, i.e. to eliminate all domains, including those at defects. To assure saturation and reproducibility, a saturating field of 2.5 kOe was used for all samples of Table I except for sample 1, for which 12 kOe was used to insure saturation.

The zero-field intercept (e.g., 140, 141) of the saturation curve was used to determine the saturation magnetization. As can be seen from FIG. 1, the saturation magnetization curves have a slight slope. This is due to a paramagnetic contribution that is of no concern herein. The saturation magnetization $4\pi M_S$ was determined by dividing the measured magnetic moment at the zero-field intercept in emu (averaged between the positive and negative sides of the

TABLE I

| Sample # | Approximate Composition | Thickness (μm) | $4\pi M_S$ (G) | $H_S$ (Oe) | $H_D$ (Oe) | μ |
|---|---|---|---|---|---|---|
| 1 | $Bi_1Eu_1Ho_1Fe_4Ga_1O_{12}$ | 86 | 14 | −2052 | | |
| 2 | $Bi_{.75}Eu_{1.5}Ho_{.75}Fe_{4.1}Ga_{0.9}O_{12}$ | 98 | 42 | −650 | | |
| 3 | $Bi_1Tb_2Fe_{4.41}Ga_{.59}O_{12}$ | 442 | 82 | −390 | | 1.33 |
| 4 | $Bi_1Tb_2Fe_{4.44}Ga_{.56}O_{12}$ | 312 | 119 | −221 | | 1.26 |
| 5 | $Bi_1Tb_2Fe_{4.46}Ga_{.54}O_{12}$ | 306 | 151 | | 3 | 1.17 |
| 6 | $Bi_1Tb_2Fe_{4.49}Ga_{.51}O_{12}$ | 302 | 189 | | 7 | 1.21 |
| 7 | $Bi_1Tb_2Fe_{4.55}Ga_{.45}O_{12}$ | 304 | 270 | | 43 | 1.23 |
| 8 | $Bi_1Tb_2Fe_{4.58}Ga_{.42}O_{12}$ | 342 | 313 | | 276 | 1.14 |
| 9 | $Bi_1Tb_2Fe_5O_{12}$ | 318 | 878 | | 800 | 1.17 |

An exemplary further composition that meets the requirements for hard latching is $Bi_1Eu_2Fe_4Ga_{0.5}Al_{0.5}O_{12}$.

We have found it desirable to reduce the saturation magnetization by use of iron substituents (e.g., Ga) and magnetic rare earths with a relatively low (inverse) temperature contribution. Eu is unique in that it is a light rare earth without 1/T temperature dependence, yet significantly reduces the saturation magnetization. Thus, currently preferred compositions contain Eu in concentration compatible with the required values of saturation magnetization and Faraday rotation. Modest concentrations of other rare earths that exhibit relatively low temperature dependence (e.g., Ho) are typically also acceptable.

As stated above, high concentrations of Gd, Tb and/or Dy are undesirable. More specifically, preferred compositions contain less than 1 atom per formula unit of Gd, less than 2.1 (preferably less than 1.5) atom per formula unit Tb, and less than 2.5 (preferably less than 2.0) atoms per formula unit Dy, subject to the criterion Gd+(Tb/2.1)+(Dy/2.5)<1.0, where Gd, Tb and Dy stand for the concentration, in atoms per formula unit, of gadolinium, terbium and dysprosium, respectively. Most preferred are compositions that are substantially free of Gd, Tb and Dy.

A significant aspect of the invention is the nature of the magnetization loop of the garnet material. FIG. 1 shows the magnetization for three exemplary samples, namely samples 2–4. A conventional vibrating sample magnetometer was used to measure the magnetic moments of the sample, with the applied magnetic field normal to the sample plane. All samples were free-standing (i.e., removed from the substrate), fully polished, with conventional anti-reflection coatings applied.

loop) by the sample volume in $cm^3$ and a shape factor (to account for non-uniformity of the magnet field), then multiplying by $4\pi$. The thus determined saturation magnetization was used to scale, in known manner, the measured (B–H) curves to $4\pi M$–H curves that are independent of sample size.

In FIG. 1, reference numerals 10–12 refer to the magnetization loops of samples 2–4 of Table I, respectively. All three loops are substantially rectangular hysteresis loops that are characteristic of latching material. In all these samples the switching field ($H_S$) is greater in magnitude than the saturation magnetization ($4\pi M_S$) and opposite in sign to the initial domain orientation. Numerals 130 and 131 refer to the negative and positive reversing fields of sample 2. Arrows on loop 10 indicate the direction in which the loop was traversed. The loop for sample 1 is not shown because the signal was noisy and off scale for any reasonable scale for the other data. The loop was substantially rectangular, only considerably more flattened than even loop 10.

Magnetization reversal in samples 1–4 appeared to occur substantially at the speed of domain wall motion. The slight tail at the end of reversal (e.g., at 15) may result from the coercivity of defects, or may be an artifact of the detector-recorder electronics, but is not of concern herein.

Figure 2:
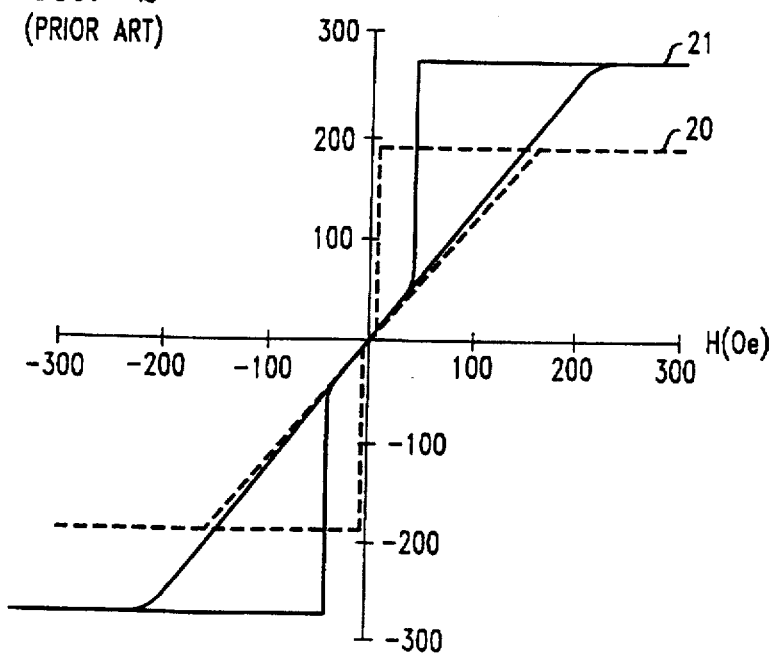

FIG. 2 shows magnetization loops 20 and 21 for samples 6 and 7, respectively. The magnetization loops clearly are not "substantially rectangular", and samples 6 and 7 thus are not samples according to the invention. The samples did not latch and had a demagnetizing field $H_D$ that is less than the field required for saturation. Garnet material that has a magnetization curve substantially as curve 21 is known. See, for instance, Mitsubishi Gas Chemical Company's Fiber Optics Catalog, 1995, p. 5. Data for sample 5 is not shown in FIG. 2 because it would substantially overlap curve 20.

Figure 3:
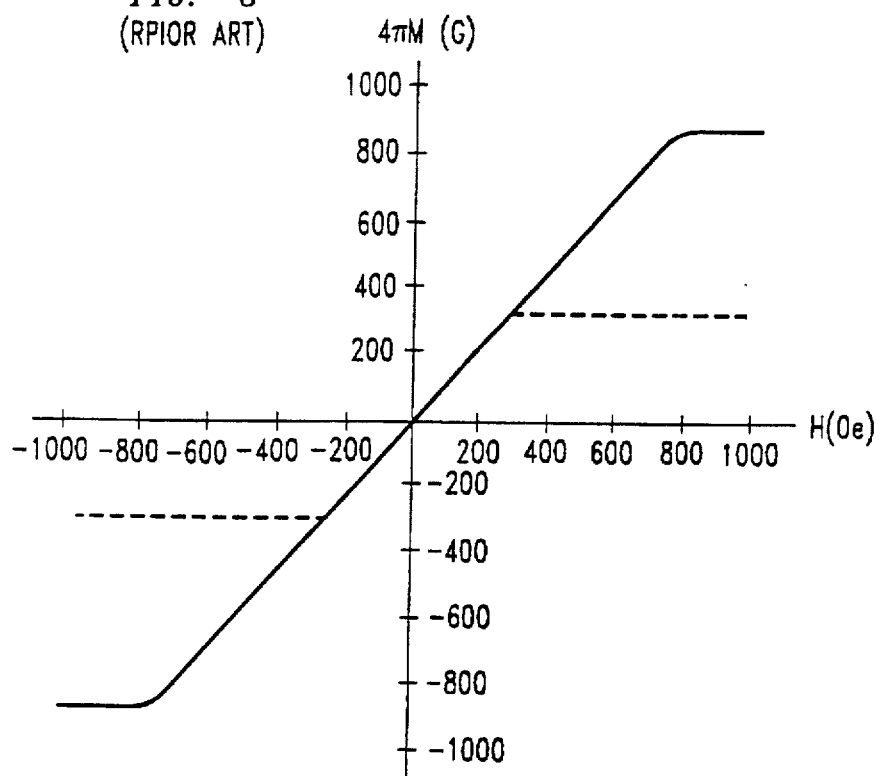

FIG. 3 shows magnetization curves (30, 31) for samples 8 and 9, respectively. As can be readily seen, the samples display no hysteresis, and do not latch. Such materials are useful for sensor applications but are not material according to this invention. Table I also shows values of effective permeability ($\mu$) for samples 3–9.

As will be readily understood by those skilled in the art, an initially saturated sample according to the invention constitutes an essentially single magnetic domain. Application of a magnetic field $>H_S$ in the direction opposite to the magnetization direction results in magnetization reversal, with the sample again being an essentially single magnetic domain.

The process of domain reversal in samples according to the invention is believed to be one of nucleation and growth. Once a domain of critical size has been nucleated it generally will grow rapidly and completely reverse the magnetization of the sample if the applied field exceeds a critical value (exemplarily about $4\pi M_S/\mu$, where $\mu$ is the permeability). Theoretical considerations suggest that substantially rectangular magnetization loops will occur in garnet material only if the saturation magnetization $4\pi M_S \leq 150$ G. In preferred embodiments of the invention the garnet is selected to have $4\pi M_S \leq 100$ G, still more preferably $\leq 80$ G.

We have observed that the apparent value of $H_S$ of a given sample not only depends on the nominal sample composition but also on the "initialization" of the measurement (i.e., on the magnitude of the magnetic field used to initially magnetize the sample), and on the shape of the sample. Initialization in a sufficiently high field (exemplarily >1 kOe, e.g. 2.5 kOe) however results in repeatable values of $H_S$. The dependence of apparent $H_S$ on the shape of the sample will typically be due to the dependence on the probability of homogeneous/heterogeneous domain nucleation.

As already alluded to, an important aspect of making at least some articles according to the invention is initializing (magnetic poling) of the magneto-optic body. Typically, such poling involves application of a magnetic field in the direction normal to the major surface of the body. The poling magnetic field is typically high enough to result in essentially complete magnetization alignment in the field direction throughout the body. Required field strengths typically are above $10^3$ Oe, and may be even above $10^4$ Oe.

At least some appropriately poled materials according to the invention have exhibited stable magnetization over extended periods (e.g., months; experiments are continuing), even in the presence of stray fields of significant magnitude and at high temperature, e.g., 125° C. Those skilled in the art will appreciate that such materials offer the possibility for simplification of known articles (e.g., optical isolators without saturating magnets), and may lead to devices not heretofore possible or practical.

Figure 4:
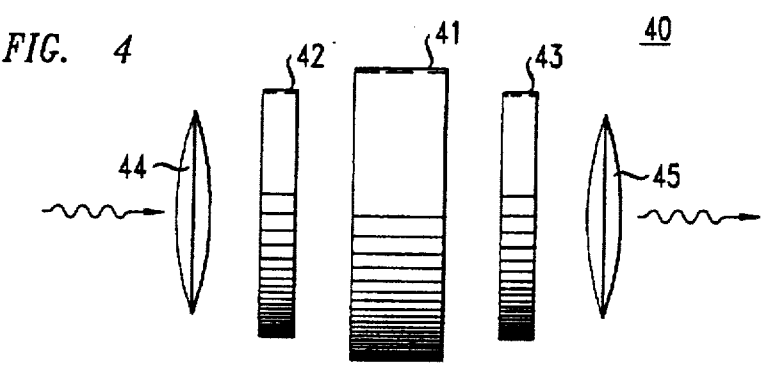
FIG. 4 schematically depicts an optical isolator according to the invention.

FIG. 4 schematically shows an exemplary article according to the invention, namely, an optical isolator, 40. Reference numeral 41 designate a garnet film according to the invention of thickness and saturation magnetization selected to yield 45° rotation of the plane of polarization of radiation of a preselected wavelength. The garnet film is poled to consist essentially of a single magnetic domain, with the magnetization being perpendicular to the plane of the film. Numerals 42–45 refer to the polarizer, analyzer, optional input focusing means, and optional output focusing means.

Preferred embodiments of isolators according to the invention do not contain a permanent magnet and rely on the latching property of the garnet layer to maintain the magnetization state. However, embodiments that contain a permanent magnet, typically of lower strength than is conventional in prior art devices, or that contain a coil adapted for applying a (typically intermittent) magnetic field to the garnet film, are contemplated.

Figure 5:
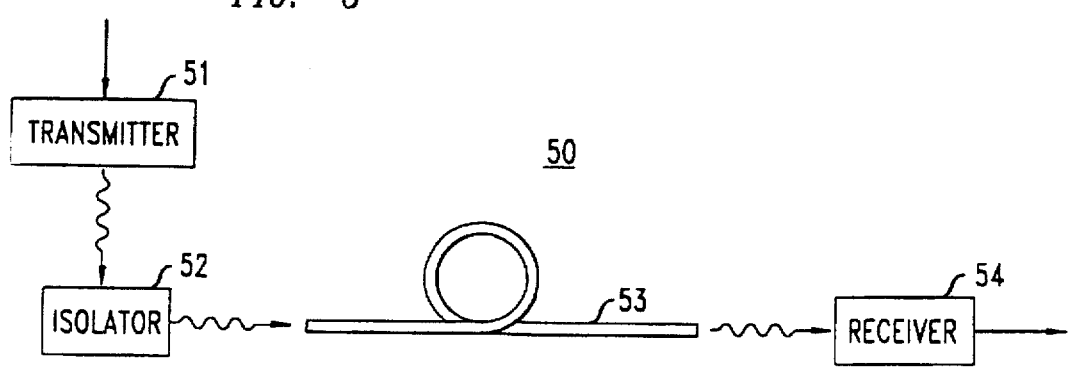
FIG. 5 schematically shows a portion of an exemplary article according to the invention, namely an optical fiber communication system, that comprises optical isolators with low moment magneto-optic material according to the invention.

Optical fiber communication systems typically comprise optical isolators. For instance, an isolator is typically placed near the transmitter laser to protect the laser against reflected signal radiation. FIG. 5 schematically depicts an optical fiber communication system 50, with numerals 51–54 referring, respectively, to the transmitter, isolator according to the invention, optical fiber, and receiver. It will be appreciated that the system can be conventional, except for the use of the isolator according to the invention.

Those skilled in the art will know that optical isolators (polarization-dependent or -independent) can also be used in conjunction with optical fiber amplifiers (see, for instance, U.S. Pat. No. 5,140,456) or other components of an optical fiber communication system (e.g., in conjunction with a conventional wavelength division multiplexer or coupler). All such uses are contemplated.

Prior art garnet compositions for optical isolator applications typically have to meet the requirement that the compensation temperature of the material lies outside the operating temperature range of the isolator, in order for the isolator to be operable at all temperatures within the range. We have found that this constraint does not apply for devices that do not contain a bias magnet. Thus, latching garnet materials according to the invention can have a compensation temperature within the operating range (e.g., −40° to 80° C.) of the isolator if the isolator does not contain a bias magnet, and indeed will frequently have the compensation temperature within that range.

This advantageous feature is a consequence of the fact that, in magnet-free devices according to the invention, the sublattice magnetizations will maintain their direction through the compensation temperature, but both the direction of the net saturation magnetization and the sign of the Faraday rotation with respect to this magnetization will change, thus cancelling each other.

The additional degree of freedom (namely, compensation temperature within the operating temperature range is allowed) makes easier attainment of the requirement that $|4\pi M_s|<100$ G over the operating temperature range, since a zero crossing near the center of the temperature range will generally minimize the saturation magnetizations at the extremes of the range.

It will be understood that "poling" (i.e., setting of the magnetization direction) of the material requires a non-zero (e.g., $\geq 5$–10 G) value of the saturation magnetization, to allow significant coupling between the poling field and the magnetization. Thus, if poling at room temperature is desired, then the compensation temperature should not be room temperature. However, it may be desirable to pole the material at high or low temperature, since in that case the composition of the material can be selected to give a compensation temperature at (or close to) room temperature (−20° C.). Such material will typically exhibit highly stable latching behavior.

EXAMPLE

A garnet body of nominal composition $Bi_1Eu_1Ho_1Fe_4Ga_1O_{12}$ is made as follows. Commercially available oxides of the relevant metals (purity 99.99% or better) are weighed and mixed substantially as described in the above referenced '697 Japanese patent application (which was published May 14, 1993, publication No. Heisei 5-117095), except that $Tb_2O_3$ is replaced by a 50/50 mole % mixture of $Eu_2O_3$ and $Ho_2O_3$, and $Fe_2O_3$ is replaced by a 80/20 mole % mixture of $Fe_2O_3$ and $Ga_2O_3$. The mixture is dissolved in conventional manner in a Pt crucible, using known fluxes. After attainment of equilibrium at 850° C., growth of the garnet material is commenced by contacting the melt with a single crystal substrate wafer of composition $(Gd_{2.68}Ca_{0.32})(Ga_{1.04}Mg_{0.32}Zn_{0.64})Ga_3O_{12}$, rotated at about 40 rpm. After attainment of the desired thickness (above 100 μm), the substrate with the garnet layer thereon is withdrawn from the melt, flux is spun off, and the combination is allowed to cool to room temperature. The substrate is removed by mechanical means, the resulting garnet wafer is divided into 11.5×11.5 mm "slabs", the slabs are optically polished on both sides, antireflection coated and diced into 2×2 mm chips that are suitable, after appropriate poling, for incorporation into an optical isolator. On one of the slabs, and several of the chips are made magnetic measurements, using a conventional vibrating sample magnetometer. The slab and chips exhibit substantially rectangular magnetization loops, with $|H_s|>|4\pi M_s|$Oe and $|4\pi M_s|<100$ G, both over the temperature range −40° to +80° C., and hard latching at room temperature and over at least a significant portion of the temperature range.

The invention claimed is:

1. An article comprising a body of magneto-optic garnet material having a nominal composition, a major surface and a magnetization $4\pi M$ in a direction normal to said major surface;

CHARACTERIZED IN THAT the nominal composition of the body is selected to comprise less than 1.0, 2.1 and 2.5 atoms per formula unit of, respectively, gadolinium, terbium and dysprosium, with Gd+(Tb/2.1)+(Dy/2.5) <1.0, where Gd, Tb and Dy are the concentrations, in atoms per formula unit, of gadolinium, terbium and dysprosium, respectively, and the nominal composition is furthermore selected such that the body has, at any temperature within a predetermined operating temperature range of the body that includes room temperature, a substantially rectangular magnetization loop, with $|H_s|>|4\pi M_s|$Oe, in a magnetic field H applied parallel to said direction normal to the major surface, where $H_s$ is the switching magnetic field of the magnetization loop, and $4\pi M_s$ is the saturation magnetization, said saturation magnetization being less than 100 G in absolute value throughout said operating temperature range, whereby said body exhibits latching behavior at any temperature within said operating temperature range.

2. An article according to claim 1, wherein the nominal composition is selected such that the body has $|H_s|\geq 500$ Oe at least at room temperature, whereby the body exhibits hard latching behavior at least at room temperature.

3. An article comprising a body of magneto-optic garnet material having a nominal composition, a major surface and a magnetization $4\pi M$ in a direction normal to said major surface;

CHARACTERIZED IN THAT the nominal composition of the body is selected such that the body has, at least at room temperature, a substantially rectangular magnetization loop, with $|H_s|>|4\pi M_s|$Oe and $|H_s|\geq 500$ Oe, in a magnetic field H applied parallel to said direction normal to the major surface, where $H_s$ is the switching magnetic field of the magnetization loop, and $4\pi M_s$ is the saturation magnetization, said saturation magnetization being less than 100 G in absolute value at least at room temperature, whereby said body exhibits hard latching behavior at least at room temperature.

4. An article according to claim 3, wherein the nominal composition comprises less than 1.0, 2.1 and 2.5 atoms per formula unit of, respectively, gadolinium, terbium and dysprosium, with Gd+(Tb/2.1)+(Dy/2.5)<1.0, where Gd, Tb and Dy are the concentrations, in atoms per formula unit, of gadolinium, terbium and dysprosium, respectively, and the nominal composition is furthermore selected such that the material has $|H_s|>|4\pi M_s|$Oe and $|M_s|<100$ G throughout a predetermined temperature range that includes room temperature, whereby the body exhibits latching behavior throughout the temperature range.

5. An article according to claim 2 or 4, wherein the nominal composition is $(Bi_xA_{3-x})(Fe_{5-y}C_y)O_{12}$, where A is selected from the group consisting of one or more of the rare earths (atomic number 57–71), Y and Ca; C is selected from the group consisting of one or more of Al, Ga, Si, Ge, Mg, Mn and Zr; x is in the range 0.3–2.0; and y is in the range 0.2–2.0, and wherein said operating temperature range includes +60° C.

6. An article according to claim 5, wherein the operating temperature range is −40° C. to +80° C.

7. An article according to claim 5, further comprising means for causing electromagnetic radiation of wavelength λ to be incident on said major surface, with said body selected such that at least some of the incident radiation is transmitted through the body and is available for reception by utilization means.

8. An article according to claim 7, wherein the article is an optical isolator that does not comprise a bias magnet.

9. An article according to claim 5, wherein the article is an optical fiber communication system that comprises a source of electromagnetic radiation of wavelength λ, utilization means for said electromagnetic radiation, a transmission path that signal-transmissively connects the utilization means and the source and that comprises optical fiber and an optical isolator that contains said body of magneto-optic garnet material, said optical isolator does not comprise a bias magnet.

10. An article according to claim 5, wherein the nominal composition comprises less than 1.5 and 2.0 atoms per formula unit of terbium and dysprosium, respectively.

11. An article according to claim 5, wherein A includes one or both of europium and holmium.

12. An article according to claim 11, wherein A is europium, or is europium and holmium.

13. An article according to claim 5, wherein the nominal composition furthermore is selected such that the body has a compensation temperature within said predetermined operating range.

14. An article according to claim 13, wherein the nominal composition is selected such that the body has a compensation temperature that is substantially at room temperature.

15. An article according to claim 5, wherein the garnet material has nominal composition selected from $Bi_1Eu_1Ho_1Fe_4Ga_1O_{12}$, $Bi_{0.75}Eu_{1.5}Ho_{0.75}Fe_{4.1}Ga_{0.9}O_{12}$, and $Bi_1Eu_2Fe_4Ga_{0.5}Al_{0.5}O_{12}$.

* * * * *